Feb. 1, 1955 E. E. LYNCH ET AL 2,701,329

LOAD FREQUENCY CONTROL TELEMETERING SYSTEM

Filed Nov. 25, 1953

Inventors:
Edward E. Lynch
George S. Lunge
by, Richard E. Hosley
Their Attorney

United States Patent Office 2,701,329

Patented Feb. 1, 1955

2,701,329

LOAD FREQUENCY CONTROL TELEMETERING SYSTEM

Edward E. Lynch, Wakefield, Mass., and George S. Lunge, Scotia, N. Y., assignors to General Electric Company, a corporation of New York Application November 25, 1953, Serial No. 394,408

6 Claims. (Cl. 318—30)

Figures 1, 2:
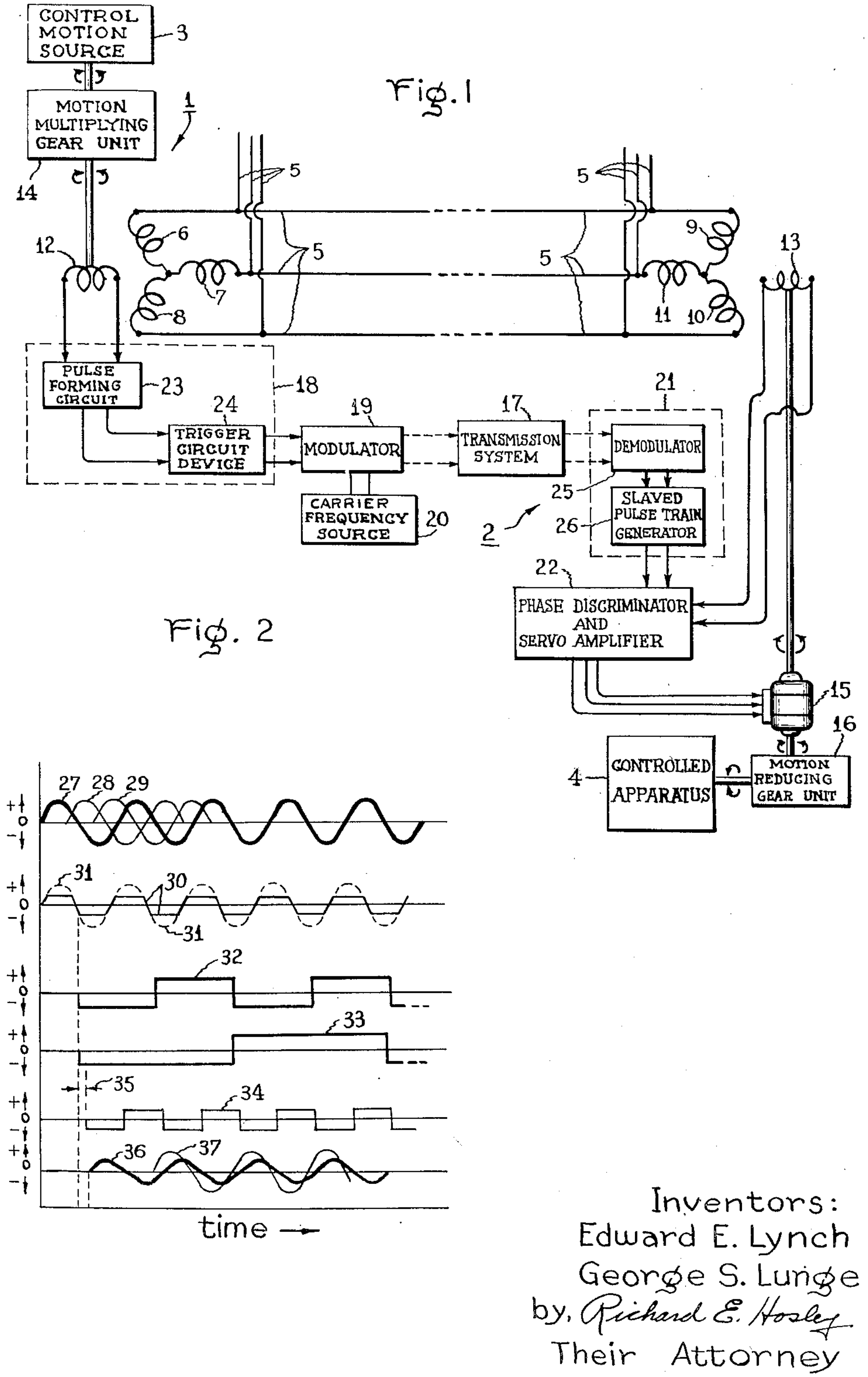

The present invention relates to improved angular motion reproducing systems and, more particularly, to motion telemetering arrangements for controlling electrical power output from intercoupled power distribution systems.

Although selsyn and control transformer equipments have been applied extensively where distance actuation and control have been required over relatively short distances, these equipments are not wholly satisfactory in such applications as those involving long distance transmission of their signals. The disadvantages arise largely out of signal attenuations and phase shifts which may introduce serious errors in the angular motion reproduction operations. The present invention is concerned with the use of selsyn-type transmitters and receivers in novel angular motion reproducing arrangements wherein the transmitting and receiving installations are widely separated, and wherein sensitivity and accuracy are not materially impaired. In particular, such an arrangement is described for use with electrical power distribution systems in which either manual or automatic control at an electrical load-dispatching center is conveyed to one or more remote electrical power generating stations to effect regulation of the electrical power output of generators at these remote stations.

Electrical load control of the aforementioned type entails certain unique considerations. While the three-phase tie lines interconnecting the load-dispatching station and the remote generating station afford a medium for communicating intelligence signals between the two, it has been found that still another medium, such as a leased telephone line or a microwave or a special carrier current transmission link, is required to establish the required minimum intercoupling between stations for telemetering purposes. In making use of the additional facilities, the frequency spectrum of the control signals transmitted through them is of pronounced importance, inasmuch as the number of information channels which can be established and the monetary rates fixed for the telemetering services are dependent upon this spectrum. Ordinarily, electrical utility companies might select the readily-available 60 cycle signal as that for translating the additional control information, but the above factors weigh heavily in favor of the use of much lower frequency signals. As appears more fully hereinafter, the present invention advantageously entails transmission of control signals having submultiple frequencies, without loss of information needed to provide precise control.

Accordingly, it is one object of the present invention to provide a novel and improved motion reproducing apparatus which is highly accurate and consumes a minimum frequency spectrum when performing control over long distances.

It is a further object to provide an electrical load-dispatching arrangement having precise low-frequency telemetering equipment which introduces negligible time lags.

By way of a summary account of one aspect of this invention, there are provided an A. C. transmitting selsyn at a load-dispatching station and a similar receiving selsyn at a remote power generating station, the three-phase 60 cycle stators of both selsyns being coupled by way of a three-phase tie line between the stations. Angular motions which are to be repeated at the receiving station are applied to the transmitter single phase rotor through a gear box speed-multiplying unit which causes the rotor to turn a predetermined number of revolutions for a given initial angular movement, and the corresponding repeated movement at the receiving station is that of the output of a speed-reducing gear unit driven by an electric motor. The 60 cycle output signal from the transmitter rotor is translated into a phase-synchronized submultiple frequency signal, preferably a 15 cycle signal, which is modulated onto a carrier which is transmitted to the receiving station. At the receiving station, the 15 cycle signal is demodulated, multipled into a phase-synhcronized 60 cycle signal, and compared with the 60 cycle rotor output of the receiver selsyn-type unit in a phase discriminator, and the amplified output of the phase discriminator is applied to the electric motor which drives the receiver rotor and speed-reducing gear unit. Angular output of this gear unit may control the valves of a turbine which actuates an electric generator, for example, thereby regulating the generator power output.

Although the features of this invention which are believed to be novel are set forth in the appended claims, the details of a preferred embodiment and further objects and advantages may be most readily comprehended by reference to the following description taken in connection with the accompanying drawings, wherein:

Figure 1 illustrates a partly schematic and partly block-diagrammed telemetering arrangement constructed in conformity with the teachings of this invention; and Figure 2 portrays graphically the electrical signals appearing in the arrangement of Figure 1.

That arrangement for practicing this invention which appears in Figure 1 includes a control station 1, which may be a load dispatcher's station in an electrical power generation and distribution system, and a remote slaved station 2, which may comprise one of several distant power generating stations in such a system. The distance actuation accomplished is that of translating angular movements from the control motion source 3 at the dispatcher's transmitting station, movements such as the manual or automatic turning of a control shaft or knob, into accurately regulated angular movements of a controlled apparatus 4 at the remote receiving station, the controlled apparatus comprising a turbine valve on a generator installation, for example. With such telemetering, the power output of a single distant generator or outputs of generators in a remote group may be controlled at the dispatcher's will, or in accordance with a predicted demand schedule, or in accordance with instantaneous demands sensed or calculated automatically. Inasmuch as the load-dispatcher's station itself usually is one of several generating stations interconnected by three-phase tie lines, represented by numeral 5, the present telemetering arrangement makes use of such tie lines to establish a pre-set relationship between the intelligence signals transmitted and received. As appears more fully hereinafter, this telemetering arrangement involves phase comparisons, and the unchanging relationships of the three-phase signals at one station at one point along the tie line to the three-phase signals at another station at another point along the tie line is distinctly advantageous. In this connection, it is a distinguishing characteristic that the three-phase tie lines, or other three-phase interconnections, do not themselves carry the required intelligence signals from one to another location, but only insure the aforementioned fixed phase relationships. Referring to the system of Figure 1, the tie lines or three-phase interconnections 5 are energized with three-phase electrical power, and are connected across the three-phase stator windings 6, 7 and 8 of a transmitter selsyn device at station 1 and across the three-phase stator windings 9, 10 and 11 of a receiver selsyn device at station 2. These three-phase stator windings produce net electromagnetic fields which are of uniform amplitudes and which rotate in phase at the supply frequency of 60 cycles per second. While the phase-rotating stator fields may be of slightly different phases at the two stations, due to phase shifts along the interconnecting supply lines, they are phase-synchronized, i. e., they bear a substantially fixed phase relationship to one another, because of the fixed interconnection of these supply lines.

Each of the transmitter and receiver selsyn devices includes a rotor winding which has a single-phase 60 cycle output signal induced in it by the corresponding stator field in which it is positioned. Rotor winding 12 at station 1 has such a signal induced in it, the phase of its signal being unique for each angular position it assumes in relation to the stator windings 6, 7 and 8. Similarly, the phase of output signals from rotor 13 at station 2 is unique for each different angular orientation in relation to stator windings 9, 10 and 11. Transmitter rotor winding 12 is angularly oriented by the control motion source 3 through a motion-multiplying gear unit 14 which turns winding 12 through a relatively large number of revolutions for each small given angular movement at source 3. Servomotor 15 at the receiving station 2 follows the rotations of transmitter rotor winding 12, in a manner described hereinafter, and also rotates the receiver rotor winding 13 and a motion-reducing gear unit 16, the latter causing a minute predetermined angular movement of the controlled apparatus 4 for each relatively large and predetermined number of revolutions of the servomotor 15. The angular motions of control motion source 3 and the controlled apparatus 4 may be in a unity ratio or in any other proportion, angular movements of the controlled apparatus preferably being much smaller than those of the control motion source 3 to achieve a precision control with the telemetering arrangement here disclosed.

Control information is contained in the 60 cycle output of transmitter rotor winding 12 by virtue of the phase of that output, and it is necessary to transmit this intelligence to the receiving station 2. For this purpose, a further transmission medium is required, such as a carrier-current leased telephone line or a wireless system. Transmission system 17 represents facilities of this nature between stations 1 and 2. It was noted earlier that the frequency spectrum covered by the transmitted intelligence signals must be minimized to permit economies both in relation to monetary charges for transmission of the signals and in relation to the number of signal channels which may be carried by one transmission system. The 60 cycle intelligence signal developed at station 1 is of too high a frequency in these respects, and, because the intelligence is characterized solely by the phase of this signal, a phase-synchronized 15 cycle signal is produced and transmitted to station 2 to accomplish the desired control. The aforementioned transmission economies are thus greatly enhanced.

Dashed-line enclosure 18 represents a phase-synchronized frequency divider which is responsive to the output of the 60 cycle transmitter rotor winding 12 and produces a submultiple pulse frequency of, say, 15 cycles which bears a fixed phase relationship to the phase of the 60 cycle input signal. This 15 cycle synchronized pulse output is applied to a suitable modulator 19, which superimposes it upon a much higher frequency carrier received from the carrier frequency source 20. Transmission system 17 delivers the modulated carrier to a phase-synchronized demodulator and frequency multiplier, designated by the dashed-line enclosure 21, wherein the 15 cycle modulation signal is recovered and quadrupled into a 60 cycle signal having a phase fixedly related to the phase of the 60 cycle signal output from transmitter rotor winding 12. Amplitudes are not critical, so that attenuations in transmission between stations are of no real concern. It is also unimportant what magnitudes of phase shifts are encountered in the entire transmission process, as long as these are roughly constant.

The 60 cycle output of apparatus 21 at the receiving station 2 is applied to a phase discriminator and servo amplifier 22 together with the 60 cycle output of the receiver rotor winding 13. These two outputs are compared in phase by device 21, and any deviations in a predetermined relationship of their phases, such as might occur if receiver rotor winding 13 were not in angular correspondence with transmitter rotor winding 12, results in an output of electrical signals which will rotate the servo motor 15 in a direction tending to establish angular correspondence between receiver rotor winding 13 and transmitter rotor winding 12. Discriminator amplifiers of this nature are well known in the servo art.

For each angular movement from the source 3 at station 1 there thus results a predetermined angular movement of apparatus 4 at station 2. First, geared multiplication of movement at station 1 by unit 14 occasions a larger number of revolutions of rotor winding 12 for each turn of the motion source 3. Receiver rotor winding 13 is driven through the same number of revolutions by servo motor 15, irrespective of the most serious variations likely to be encountered in the phase shifts during transmission of intelligence between the stations. Should the receiver rotor winding lack an exact angular correspondence with the transmitter rotor winding, this would amount to only a very minute resultant error because of the large number of complete turns gone through to convey the intelligence from motion source 1. Further, servo motor 15 actuates the controlled apparatus 4 through the geared speed-reducing unit 16, such that the reproduced motion is precise.

The phase-synchronized frequency divider 18 at transmitting station 1 may include a pulse-forming circuit 23 and a trigger circuit device 24 in one embodiment. And the phase-synchronized frequency multiplier and demodulator 21 at the receiving station 2 may include a demodulator 25 and a slaved pulse train generator 26, in one embodiment. The mode of operation of the telemetering arrangement as a whole and these elements in particular may be more readily understood through reference to the wave forms plotted in Figure 2 against a common time abscissa. Curves 27, 28 and 29 are representative of the three-phase 60 cycle supply voltages appearing on tie lines 5 and across the stator windings 6–8 and 9–11 at the transmitting and receiving stations. These voltages are of course phased 120 degrees apart. Curve 27 may also be taken to be representative of an instantaneous 60 cycle voltage induced in the transmitter rotor winding 12 when it is at a given position. For each different angular position, however, the induced voltage would have a different and characteristic phase. Assuming that curve 27 is the voltage output of rotor winding 12 at the angular orientation shown, it is next converted into a 60 cycle pulse train 30 by pulse-forming circuit 23. Such a pulse train may be produced by the well known expedient of clipping or limiting the sinusoidal 60 cycle wave at the levels illustrated, the clipped peak portions of the wave 27 being designated by dashed lines 31.

Trigger circuit device 24 may also be comprised of known components, and, preferably includes a pair of series-coupled biased relaxation oscillators known as binary scalers. A suitable oscillator is one triggered to produce a pulse output of one polarity when a first negative input pulse is applied and then a pulse of the opposite polarity when the next negative pulse is applied. Plot 32 illustrates the waveform of output from the first of a pair of binary scalers responding to negative pulses from the signal 30, and plot 33 illustrates the output from the second of such binary scalers. The latter plot 33 shows the frequency of output to be one quarter of that of the transmitter rotor winding output signal, or 15 cycles per second. This 15 cycle signal is impressed upon the transmitting carrier and is reproduced by the demodulator 25 at receiving station 2. There, the 15 cycle signal is applied to the slaved pulse train generator 26, which may comprise a conventional multivibrator arranged to produce a 60 cycle pulse output having a fixed phase relation to the applied 15 cycle signal. In this frequency multiplying apparatus, the 15 cycle signal phase synchronizes the multivibrator output. Pulse train 34 represents such output, which may have a fixed phase shift 35 relative to the 15 cycle synchronizing signal 33. Preferably, a tuned circuit or equivalent shaping means (not illustrated) is employed to produce a 60 cycle sinusoidal wave 36 from the 60 cycle pulse train 34, and the phase discriminator portion of device 22 compares the phase of wave 36 with that of wave 37, the latter representing an output signal from the receiver rotor winding 13. When the phases of these two waves do not have a predetermined relationship, the servo amplifier portion of device 22 applies a signal to servo motor 15 which will cause motor 15 to turn until the receiver rotor winding 13 produces an output signal which does have a predetermined phase relation to the wave 36. It should be recognized, in this connection, that the wave 36 and the signal from the receiver rotor winding 13 need not be exacly in phase for the null condition to obtain, but need only have some predetermined phase relationship. Nor is it of consequence that the phase of wave 36 is not coincident with those phases of waves 35, 33, 32, 30 or 27. It is enough that the phase relationships be fixed.

Operation of the instant telemetering system is continuous. The 60 cycle phase—characterized outputs of the transmitter and receiver selsyn rotors are uninterrupted and the transmission of phase-characterized submultiple-frequency intelligence signals between stations is continuous also. Accordingly, the translation of information involves no troublesome lags, and the response achieved is substantially instantaneous. Further, it is unnecessary to monitor the remote station receiver operation continuously at the transmitting station, inasmuch as the two stations will not fall substantially out of synchronism once that condition has been established and no power interruptions occur. As a practical matter, when the system is used for load-dispatching purposes in a power generation system, and should power interruptions occur to destroy such synchronism, it is merely necessary to re-set the controlled apparatus to the proper orientation manually, and the system will remain in synchronism thereafter. Slight or transient variations in the tie line supply frequency have no substantial effect upon the system accuracy.

Although the apparatus has been described with particular reference to load-dispatching systems, it should be apparent that it is equally advantageous in other distance actuation and control arrangements. Further, the telemetering system may employ components different from those referred to in describing the preferred embodiment. By way of illustration, it is obvious that frequency division and multiplication, and the production of synchronizing pulses, may be accomplished in other ways involving only the exercise of routine design skills or simple substitutions.

Therefore, while particular apparatus and a preferred embodiment are noted herein, obvious alternatives, substitutions, modifications and combinations should occur to those skilled in the art without departing in spirit or scope from the broadest aspects of this invention as set out in the appended claims.

What we claim as new and desire to secure by Letters Patent of the United States is:

1. An angular motion translation system comprising first and second devices each having a pair of relatively rotatable electrical windings and each producing a single phase output of electrical signals from a corresponding one of said pairs of windings which characterize in electrical phase the relative angular orientations of the pair of electrical windings thereof, three-phase interconnections between said devices applying three-phase excitation of substantially a predetermined frequency to the others of said pairs of windings of both of said devices, said output signals of each of said devices being of substantially said predetermined frequency, a frequency divider for producing an output of electrical signals which is of a predetermined submultiple frequency of and has a fixed phase relation to input electrical signals applied thereto, means applying the single phase output of said first device as input to said frequency divider, a frequency multiplier for producing an output of electrical signals of substantially said predetermined frequency from input signals of said submultiple frequency, the output of said frequency multiplier having a fixed phase relation to the input thereof, means transmitting said output of said frequency divider to said frequency multiplier as said input signals for said frequency multiplier, a phase-discriminator for producing electrical output signals characterizing the phase relationship of two electrical signals applied thereto, means applying the output signals of said second device and said frequency multiplier to said phase-discriminator, a servo motor angularly coupled to rotate one of said pair of windings of said second device, and means for energizing said servo motor to rotate in accordance with said output signals of said phase-discriminator.

2. An angular motion translation system comprising first and second devices each having relatively rotatable stator and rotor electrical windings and each producing a single phase output of electrical signals from one of its windings which characterizes in electrical phase the relative angular orientations of its windings, three-phase interconnections between said devices applying three-phase excitation of substantially a first frequency to the other of said windings of both of said devices, said output signals of each of said devices being of substantially said first frequency, a frequency divider producing an output of electrical signals having a second frequency which is a predetermined submultiple of and fixed in phase relation to signals of said first frequency applied thereto, means applying the single phase output of said first device to said frequency divider, a frequency multiplier for producing output signals of substantially said first frequency from input signals of said second frequency, the output of said frequency multiplier having a fixed phase relation to the input thereof, means transmitting said output of said frequency divider to said frequency multiplier as said input signals for said frequency multiplier, a phase-discriminator for producing electrical output signals characterizing the phase relationship of two electrical signals applied thereto, means applying the output signals of said second device and said frequency multiplier to said phase-discriminator, a servo motor driving the rotor winding of said second device, and means applying said output signals of said phase-discriminator to said servo motor.

3. An angular motion translation system comprising first and second devices each having relatively rotatable stator and rotor windings, one of said windings comprising a polyphase winding arrangement and the other a single phase winding for producing single phase electrical output signals characterizing in electrical phase the relative angular orientations of said stator and rotor windings, polyphase interconnections between said devices applying polyphase excitation of substantially a first frequency to the polyphase windings of both of said devices, said single phase electrical signals being of substantially said first frequency, frequency divider means responsive to said output signals from said first device producing an output of electrical signals having a second frequency which is a predetermined submultiple of said first frequency and having an electrical phase fixed in relation to the phase of said output signals from said first device, frequency multiplying means for producing output signals of said first frequency in response to and with a fixed phase relation to applied signals of said second frequency, means transmitting and applying said frequency divider means output signals to said frequency multiplier means, a servo motor driving the rotor winding of said second device, means comparing the phases of said frequency multiplying means output signals and said output signals from said second device to produce electrical servo signals for rotating said servo motor in directions to establish a predetermined phase relationship between said frequency multiplying means and second device output signals, and means applying said electrical servo signals to said servo motor.

4. An angular motion translation system comprising a first device at a first location having relatively rotatable stator and rotor windings, one of said windings including a polyphase winding arrangement and the other a winding producing single phase electrical output signals characterizing in electrical phase the relative angular orientations of said rotor and stator windings, a second device similar to said first device at a second location remote from said first location, polyphase tie lines interconnecting said devices and applying polyphase excitation signals of substantially a first frequency to the polyphase windings of both of said devices, said single phase electrical signals being of substantially said first frequency, frequency dividing means at said first location responsive to said output signals from said first device producing an output of electrical signals having a second frequency which is a predetermined submultiple of said first frequency and having an electrical phase fixed in relation to the phase of said output signals from said first device, frequency multiplying means at said second location for producing output signals of said first frequency responsive to and with a fixed phase relation to applied signals of said second frequency, carrier current means transmitting and applying said frequency dividing means output signals to said frequency multiplying means at said second location, a servo motor at said second location driving the rotor winding of said second device, means at said second location comparing the phases of said frequency multiplying means output signals and the output signals from said second device to produce electrical servo signals for rotating said servo motor in directions to establish a predetermined phase relationship between said frequency multiplying means and second device output signals, and means applying said electrical servo signals to said servo motor.

5. An angular motion translation system comprising a first device at a first location having relatively rotatable stator and rotor windings, one of said windings including a polyphase winding arrangement and the other a winding producing single phase electrical output signals characterizing in electrical phase the relative angular orientations of said rotor and stator windings, a source of angular control motion at said first location, motion-multiplying means at said first location rotating said rotor winding of said first device a larger number of times for each complete rotation of said control motion source, a second device similar to said first device at a second location remote from said first location, polyphase tie lines interconnecting said devices and applying polyphase excitation signals of substantially a first frequency to the polyphase windings of both of said devices, said single phase electrical signals being of substantially said first frequency, frequency dividing means at said first location responsive to said output signals from said first device producing an output of electrical signals having a second frequency which is a predetermined submultiple of said first frequency and having an electrical phase fixed in relation to the phase of said output signals from said first device, frequency multiplying means at said second location for producing output signals of said first frequency responsive to and with a fixed phase relation to applied signals of said second frequency, carrier current means transmitting and applying said frequency dividing means output signals to said frequency multiplying means at said second location, an angular motion speed-reducing unit at said second location, a controlled apparatus at said second location controlled responsive to angular output movements of said speed-reducing unit, a servo motor at said second location driving said speed-reducing unit and the rotor winding of said second device, means at said second location comparing the phases of said frequency multiplying means output signals and the output signals from said second device to produce electrical servo signals for rotating said servo motor in directions to establish a predetermined phase relationship between said frequency multiplying means and second device output signals, and means applying said electrical servo signals to said servo motor.

6. An angular motion translation system as set forth in claim 5 wherein said polyphase winding arrangements of said devices comprise three-phase three-coil windings, wherein said polyphase excitation signals comprise 60 cycle three-phase signals, wherein said frequency dividing means comprises at least one binary scaler producing electrical pulse output signals, wherein said carrier current transmission means comprises a carrier current source and a modulator for superimposing said pulse output signals on a carrier at said first location and a demodulator for reproducing said pulse signals at said second loaction, and wherein said frequency multiplying means at said second location comprises an oscillator slaved by pulse signals reproduced by said demodulator.

No references cited.